Aug. 19, 1947.  I. W. COX  2,425,919

METHOD OF MAKING METAL MOLDING MATERIAL

Filed July 28, 1943

Inventor
Irvin W. Cox
By Frank H. Hubbard
Attorney

Patented Aug. 19, 1947

2,425,919

UNITED STATES PATENT OFFICE 2,425,919

METHOD OF MAKING METAL MOLDING MATERIAL

Irvin W. Cox, West Allis, Wis., assignor to Cutler-Hammer, Inc., Milwaukee, Wis., a corporation of Delaware Application July 28, 1943, Serial No. 496,456

3 Claims. (Cl. 106—286)

1

This invention relates to a method of making metal molding material.

A primary object of the invention is to provide a metal powder in flake form, which metal flakes are particularly adapted to cold weld to each other under relatively high molding pressure to provide formed articles of relatively high tensile strength.

Another object is to provide a novel and economical method of producing such a metal powder.

Another object is to provide such a method wherein both electrolytic and mechanical steps are employed to produce the novel metal powder.

Another and more specific object is to provide a method of producing flake-form silver powder which in its initial form is of the proper degree of fineness for molding under pressure to produce electrical contact tips and the like.

Another object is to provide a silver powder in flake form which is adapted to be simultaneously molded to the desired form and rigidly attached to a suitable metal support as an incident to the molding operation; the article thus formed being adapted for use without sintering or other heat treatment.

Another object is to provide a method of producing flake-form powders from various metals which can be electroplated.

Other objects and advantages of the invention will hereinafter appear.

The accompanying drawings illustrate, by way of example, one form of apparatus which may be utilized for carrying out the steps of my novel method.

Figure 1:
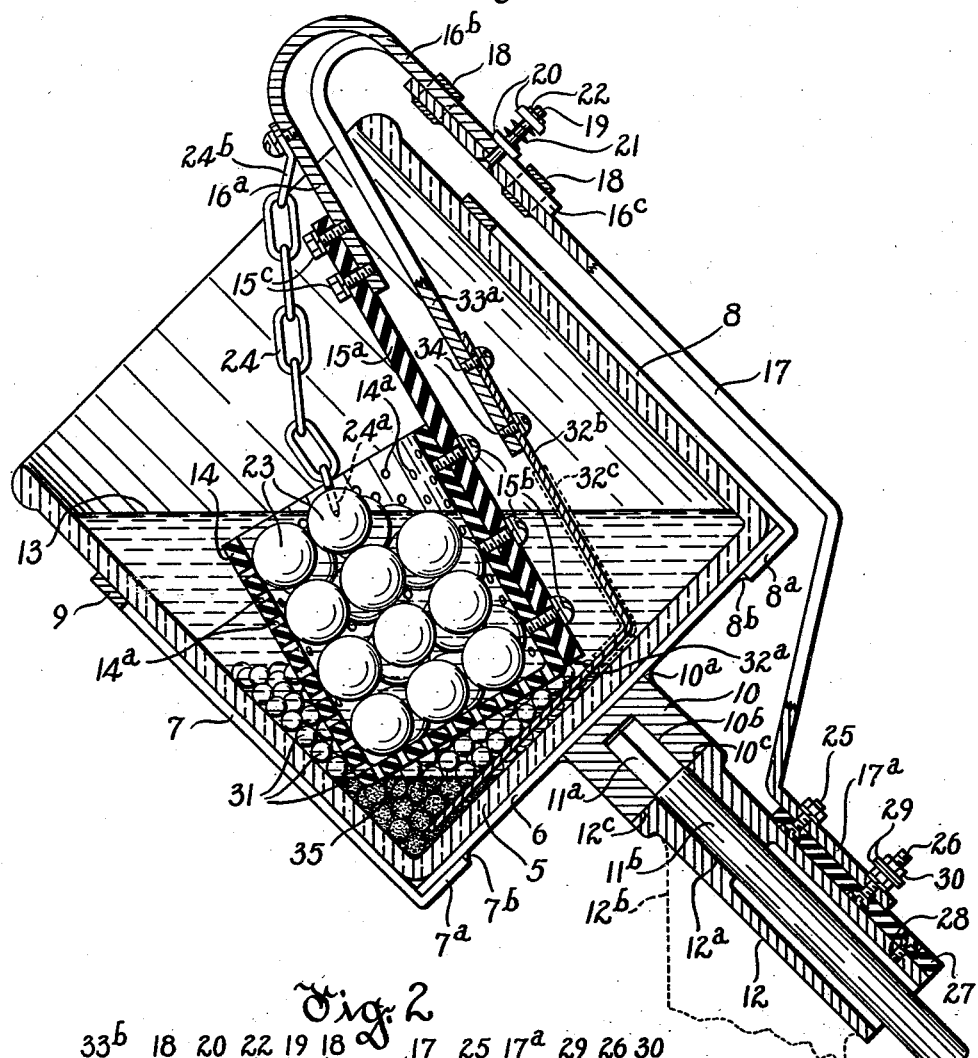
Figure 2:
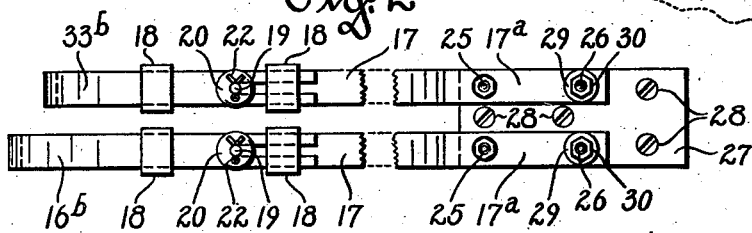

In the drawings, Figure 1 is a vertical sectional view of a device adapted for the production of metal powder in flake form in accordance with my invention, and Fig. 2 is a fragmentary side elevational view of certain of the elements of the device of Fig. 1.

Referring to the drawings the numeral 5 designates a barrel or cylindrical container of earthenware or other suitable insulating material, said container having an open upper end, and the same being freely insertable into and removable from a metal basket or support, which as shown is preferably fabricated from sheet metal. Thus said basket is shown as comprising a circular plate 6 of a diameter substantially corresponding to that of container 5. A plurality of sheet metal arms extend downwardly throughout the major portion of the length of container 5 and have their lower end portions bent inwardly over the lower surface of plate 6 and are rigidly attached to the latter as by welding or brazing. In practice I prefer to provide four arms equally spaced about the periphery of container 5, one diametrically opposed pair of said arms being shown at 7 and 8; the inwardly bent lower end portions thereof being designated by numerals 7ª and 8ª, and the welded connections thereof to plate 6 being shown at 7ᵇ and 8ᵇ, respectively. The upper ends of said four arms may be integral with or rigidly connected (as by welding) to a metal ring 9 which surrounds the upper portion of container 6; the pair of arms 7 and 8 being shown integral with ring 9. In practice ring 9 is formed of a sheet metal strip or plate bent to circular form, the adjacent end portions (not shown) of which are rigidly connected to each other by welding.

Plate 6 has welded or otherwise rigidly attached thereto, and located centrally thereof, as shown at 10ª, a metal hub member 10. Member 10 has formed therein a centrally located recess 10ᵇ of square or other polygonal form in transverse cross section, to accommodate the correspondingly shaped upper end portion 11ª of a rod or shaft 11 which is adapted to be rotatably driven at the desired speed in any suitable manner, as by means of an electric motor (not shown). The portion 11ᵇ of shaft 11 is preferably of circular form in transverse cross section, and is adapted to bear within a correspondingly shaped opening or passage 12ª formed in a supporting and bearing bracket 12, a fragment of the leg or pedestal of which is indicated in dotted lines at 12ᵇ. The upper end 12ᶜ of bracket 12 is adapted to provide a bearing seat for the lower end 10ᶜ of member 10. The axis of rotation of the aforementioned parts is preferably at a predetermined angle to the vertical, for the purpose hereinafter set forth; it being understood that upon rotation of the aforedescribed metal basket the container 5 will likewise be rotated at a corresponding speed.

It may be assumed that the container 5 shown in Fig. 1 has a capacity of two gallons when completely filled. Due to the angular mounting thereof, however, the contents of the container will preferably be somewhat less than one-half of its full capacity. If it is desired to form flaked silver powder a suitable quantity of silver nitrate 13 is placed in container 5, such liquid preferably consisting of a forty per cent solution which is slightly acid with nitric acid (HNO₃).

Positioned within container 5 is an auxiliary container 14 composed of any suitable insulating material. Container 14 is provided with a multiplicity of perforations, as indicated at 14ª to provide relatively free communication between the portions of the electrolyte 13 within and without the same. Container 14 is supported in a substantially fixed position, through the medium of a bracket the insulating portion 15ª of which is attached to container 14 as by means of screws or bolts 15ᵇ. The upper end of portion 15ª is attached by screws 15ᶜ to the downwardly extending arm portion 16ª of a reflexed metal bus member of good electrical conductivity, such as copper; the other downwardly extending arm portion 16$^b$ of said member being removably attached to a combined support and wiring terminal member 17 of like material and caliber. More particularly, member 17 has rigidly attached thereto a pair of tubes or ferrules 18, 18 of rectangular form in transverse cross section, said ferrules being adapted to slidably receive the lower end of said portion 16$^b$. Member 17 has attached thereto a rod or stud 19 which projects therefrom as illustrated.

The rod 19 has slidably mounted thereon a pair of washers 20, 20 the oppositely facing cupped portions of which are adapted to accommodate the opposite ends of a coiled compression spring 21 whereby said washers are biased away from each other. A cotter-pin 22 or the like is adapted to form a stop for the outer washer 20 whereby the other washer is yieldably biased toward member 17. The lower end of portion 16$^b$ of the aforementioned member is slotted as shown at 16$^c$ to provide clearance between the same and rod 19, to enable assembly of the parts in the manner illustrated. By this means the container 14 may be readily positioned within or removed from container 5. The anode of the device includes a multiplicity of bodies of pure or substantially pure silver which are placed within container 14, said bodies preferably being of spherical or ball-shape as shown at 23, one of said silver balls having mechanically and electrically connected thereto one end portion 24$^a$ of a chain 24 formed of a suitable conducting metal such as copper. The other end portion 24$^b$ of chain 24 is mechanically and electrically connected with portion 16$^a$ of the aforedescribed supporting bracket.

The lower end portion 17$^a$ of the combined support and wiring terminal member 17 is rigidly attached, as by means of nuts and bolts 25 and 26, to an insulating plate or base 27; the latter in turn being rigidly connected to the aforementioned bracket 12 as by means of a suitable number of screws 28 (Figs. 1 and 2). The aforementioned bolt 26 is of extra length to accommodate a pair of clamping washers 29 and a nut 30 to provide for attachment of a circuit wire.

The cathode of the device comprises a large number of polished metal balls 31, preferably stainless steel, which are relatively harder than silver and are unaffected by simple immersion in the electrolyte, located within container 5, and a cathode connection member, also preferably of stainless steel, one arm 32$^a$ of which is located adjacent to and in parallel relation with the bottom wall of container 5, for engagement with the aforementioned balls 31. The other arm 32$^b$ of said connection is mechanically and electrically connected to the downwardly extending arm portion 33$^a$ of a reflexed copper bus member and support, as by means of screws 34. Those portions of arms 32$^a$ and 32$^b$ of said cathode connection member which are immersed within the electrolyte, but which are not intended to be contacted by balls 31, are preferably coated or covered by a layer of insulation; as, for instance, by enameling, or by painting with an insulating paint, as indicated in dotted lines at 32$^c$.

The other downwardly extending arm portion 33$^b$ (Fig. 2) of said bus member is preferably similar to the aforedescribed portion 16$^b$ of the other bus member, whereby portion 33$^b$ is adapted to be readily attached to or removed from a second combined support and wiring terminal member 17, as illustrated in Fig. 2; said second member also having parts 26, 29 and 30 associated therewith to facilitate attachment of a second circuit wire (not shown).

From the foregoing it will be apparent that the container 14 and its associated parts may be readily removed from assembled relationship with container 5, and that the cathode connection member 32$^a$, 32$^b$ and its associated parts may likewise be readily withdrawn. Thereupon the basket 6, 7, 8 and container 5 may be removed jointly from the shaft end 11$^a$ and support 12 to provide for emptying of said container.

In the particular device illustrated I prefer to employ stainless steel balls 31 of five-sixteenths of an inch in diameter, and to supply a current at 12 volts D. C. The shaft 11 (and consequently the container 5) is preferably driven at the rate of 60 R. P. M., and the operation is preferably effected with the electrolyte 13 at a temperature of 90 degrees F.

Thus upon assembly of the various parts of the device as illustrated, and assuming connection of terminal bolts 26, 26 to the source of direct current supply and driving of shaft 11 as aforedescribed, it is to be understood that silver will be dissolved from the silver balls 23 and precipitated from the silver nitrate solution 13 onto the aforementioned polished stainless steel balls 31 which form the cathode. Thus the silver tends to coat or plate the surfaces of said balls 31. However, due to the smooth and polished condition of balls 31 the silver film formed on each of the same does not strongly adhere thereto. Moreover, because of the rotation of container 5 the balls 31 are also moved or rotated relatively to each other; and as a consequence the silver films formed thereon are rolled therebetween and mechanically compacted thereby, so that the areas of the more or less spherical silver films tend to be increased over those of the spheres (balls 31) on which they are deposited. Consequently said films loosen and buckle or wrinkle and are subject to attrition and complete removal in the form of relatively small flakes; so that said flakes tend to precipitate toward the lowermost portion of container 5. However the continued motion of container 5 tends to keep said flakes suspended in the electrolyte 13. Nevertheless after formation of the silver flakes the same may be rolled a number of times between the balls 31.

As shown by the level thereof at line 35 in Fig. 1, the silver flakes tend to precipitate toward the lowermost portion of container 5; but during rotation of container 5, with consequent movement of electrolyte 13, such precipitation of the flakes is minimized. Certain of the balls 31 will be interspersed between the silver powder flakes which do reach the lowermost portion of container 5. These lowermost balls 31 will effect a certain amount of attrition or breaking up of the silver flakes. However, the flake-form of the silver particles is not only not destroyed but is further accentuated by such action of balls 31, with the result that the flakes are merely made smaller and thinner.

After a given period of operation of the device the solution 13 may be decanted, and the balls 31 first and the flaked silver powder thereafter being separated from said solution, whereupon the flaked silver powder may be washed and dried to render the same adaptable for use.

It will also be apparent to those skilled in the art that with a device like that illustrated the average size of the flakes in their final form will, in general, not only depend upon the length of time during which the device is operated, but the size thereof is subject to further control by varying the strength of the solution 13, or by varying the speed of rotation of container 5, or by varying the current density.

While I have herein specifically described my invention in respect of adaptability thereof to the production of silver powder in flake form, it is to be understood that such described utility is merely exemplary. That is to say, the method herein disclosed is likewise adaptable for the production, in the manner disclosed, of flaked powders of copper, nickel, iron, and various other metals which can be electroplated, where the electroplated films are sufficiently malleable to provide for mechanical compacting and flaking thereof by the aforedescribed action of polished stainless steel balls of the relative size shown at 31, or of a different size if preferred or if found desirable.

The flake-form molding powders of silver, copper, etc., produced in the manner disclosed herein may be used individually in the production of pressure molded contact tips and other articles, or said powders may be intimately mixed with other ingredients to form molding compounds adapted to provide finished articles having advantageous or desired characteristics for particular conditions of usage thereof. For example, such precipitated silver powder in flake form may be advantageously mixed with a desired percentage of cadmium oxide power to provide for production of switch contacts which are functionally equivalent to those described and claimed in my prior Patent No. 2,307,668, granted January 5, 1943, for Electrical contact; or such flaked silver powder may be combined with a predetermined percentage of cadmium sulphide in the manner proposed in my prior Patent No. 2,288,122, granted June 30, 1942, for Metallic composition for electrical contacts and the like, with substantially similar results. Such moulding compounds employing the flaked silver powder disclosed herein are, however, much less expensive than those of said Patents Nos. 2,288,122 and 2,307,668.

I claim:
1. The method of producing a metal molding material whose particles are fragments of spherical films, each fragment having a peripheral edge of irregular contour especially adapting it for interlocking with other similar fragments when flattened under molding pressure, which comprises utilizing a body of said metal as an anode within an electrolyte solution of suitable strength, electrolytically depositing films of said metal upon a multiplicity of polished stainless steel balls having cathode connections, effecting continuous movement of said stainless steel balls relatively to each other during the electrolytic action whereby the metal films on said stainless steel balls are mechanically compacted, increased in area, wrinkled and loosened with respect thereto and broken by said balls into particles of the character first mentioned.

2. The method of producing a silver molding material whose particles are fragments of spherical films, each fragment being bounded by a jagged edge especially adapting it for interlocking with other similar fragments when confined in a die at molding pressure, which comprises utilizing a body of substantially pure silver as an anode within a silver nitrate solution of suitable strength, electrolytically depositing films of said silver upon a multiplicity of polished stainless steel balls having cathode connections, effecting continuous movement of said stainless steel balls relatively to each other during the electrolytic action whereby the silver films on said stainless steel balls are mechanically compacted, increased in area, wrinkled and loosened with respect thereto and broken by said balls into particles of the character first mentioned.

3. The method of producing silver base electrical contacts, which comprises utilizing a body of substantially pure silver as an anode within a silver nitrate solution of suitable strength, electrolytically depositing films of said silver upon a multiplicity of polished stainless steel balls having cathode connections, effecting continuous movement of said stainless steel balls relatively to each other during the electrolytic action whereby the silver films on said stainless steel balls are mechanically compacted, increased in area, wrinkled and loosened with respect thereto and broken by said balls into particles in the form of fragments of spherical films, each fragment being bounded by a jagged edge especially adapting it for interlocking with other similar fragments when confined in a die at molding pressure, intimately mixing said particles with a substantial but minor proportion of cadmium oxide powder, and then molding said mixture under pressure into electrical contacts of the desired form.

IRVIN W. COX.

REFERENCES CITED

The following references are of record in the file of this patent:

UNITED STATES PATENTS

| Number | Name | Date |
| --- | --- | --- |
| 821,626 | Edison | May 29, 1906 |
| 1,709,268 | Hutchins | Apr. 16, 1929 |
| 2,157,699 | Hardy et al. | May 9, 1939 |
| 1,986,197 | Harshaw | Jan. 1, 1935 |
| 2,099,873 | Sternfels | Nov. 23, 1937 |
| 1,977,173 | Costa | Oct. 16, 1934 |
| 2,285,762 | Tuwinger et al. | June 9, 1942 |
| 888,068 | Daniels | May 19, 1908 |
| 291,670 | Body | Jan. 8, 1884 |
| 2,273,643 | Hurd | Feb. 17, 1942 |
| 2,355,070 | Harford | Aug. 8, 1944 |
| 225,356 | Eaton | Mar. 9, 1880 |
| 2,359,401 | Wueff | Oct. 3, 1944 |
| 2,307,668 | Cox | Jan. 5, 1943 |
| 2,365,356 | Pilling et al. | Dec. 19, 1944 |
| 1,251,302 | Tainton | Dec. 25, 1917 |

FOREIGN PATENTS

| Number | Country | Date |
| --- | --- | --- |
| 312,441 | Great Britain | May 30, 1929 |

OTHER REFERENCES

Chemical Abstracts, 1936, page 2115.

Metal Cleaning and Finishing, March 1933, page 124.

Transactions of the American Electrochemical Society, vol. 59 (1931), pages 307–319.

Transactions of the American Electrochemical Society, vol. 23 (1913), pages 38, 39, 40, 41, 42 of an article by Frary.

Brass World, March 1927, page 82.